United States Patent [19]
Coleman et al.

[11] Patent Number: 6,099,873
[45] Date of Patent: Aug. 8, 2000

[54] CANDY TWISTER

[76] Inventors: Thomas J. Coleman, 19170 Paddock Pl., Abingdon, Va. 24211; William K. Schlotter, IV, 117 Wateredge La., Fredericksburg, Va. 22406; Princess Ann Coleman, 19170 Paddock Pl., Abingdon, Va. 24211; Ann M. Schlotter, 117 Wateredge La., Fredericksburg, Va. 22406

[21] Appl. No.: 09/306,721

[22] Filed: May 7, 1999

[51] Int. Cl.[7] ........................................... A23G 3/00
[52] U.S. Cl. .............................. 426/90; 426/104; 426/132
[58] Field of Search .............................. 426/90, 104, 132, 426/106, 115, 421; 446/71–73, 77, 241, 27; 401/171–175

[56] References Cited

U.S. PATENT DOCUMENTS

| | | | |
|---|---|---|---|
| 2,818,167 | 12/1957 | McKinley | ................................ 401/175 |
| 4,914,748 | 4/1990 | Schlotter, IV et al. | .................. 362/109 |
| 5,458,277 | 10/1995 | Wyzykowski | ............................ 224/202 |
| 5,531,318 | 7/1996 | Coleman et al. | ........................ 206/738 |
| 5,874,119 | 2/1999 | Coleman et al. | ........................ 426/104 |

*Primary Examiner*—Milton Cano
*Assistant Examiner*—Sherry A. Dauerman
*Attorney, Agent, or Firm*—Melvin L. Crane

[57] ABSTRACT

A candy holder candy twister including a main housing in which a piece of candy contained on a hollow sleeve is removed from the housing for consumption by a threaded shaft. The threaded shaft moves the candy piece as the shaft is rotated. A cap which can be made to represent any desired facial expression, character head, alien head, hat or any other design. The cap is provided with a string or some other device by which the candy holder may be held by a person and displayed for sale.

10 Claims, 1 Drawing Sheet

CANDY TWISTER

This invention is directed to a candy twister and more particularly to a device for feeding a piece of candy from a housing as the candy is consumed.

Candy is known to come in many different forms and has been adapted for use by many different devices. Such candy devices have been patented by applicants.

This device includes a housing which contains a piece of candy which is fed from the housing by a screw threaded shaft, which is rotatable by a base. Such devices are not known to be used with candy. However, it is well known that lip stick and other cosmetic products make use of a housing which in some way feed the product from the housing.

It is therefore an object of the invention to provide a candy twister which feeds a piece of candy from a housing as a consumer consumes the candy.

Another object is to provide a novelty head or cap on the housing which is provided with means for carrying the device or for securing the device to ones body or clothing.

Yet another object is to provide a candy twister in which subsequent to consumption of the candy, another piece of candy can replace the consumed piece.

Other objects and advantages of the invention will become obvious to those skilled in the art from a review of the drawings and accompanying description.

DETAILED DESCRIPTION

Figures 1, 2:
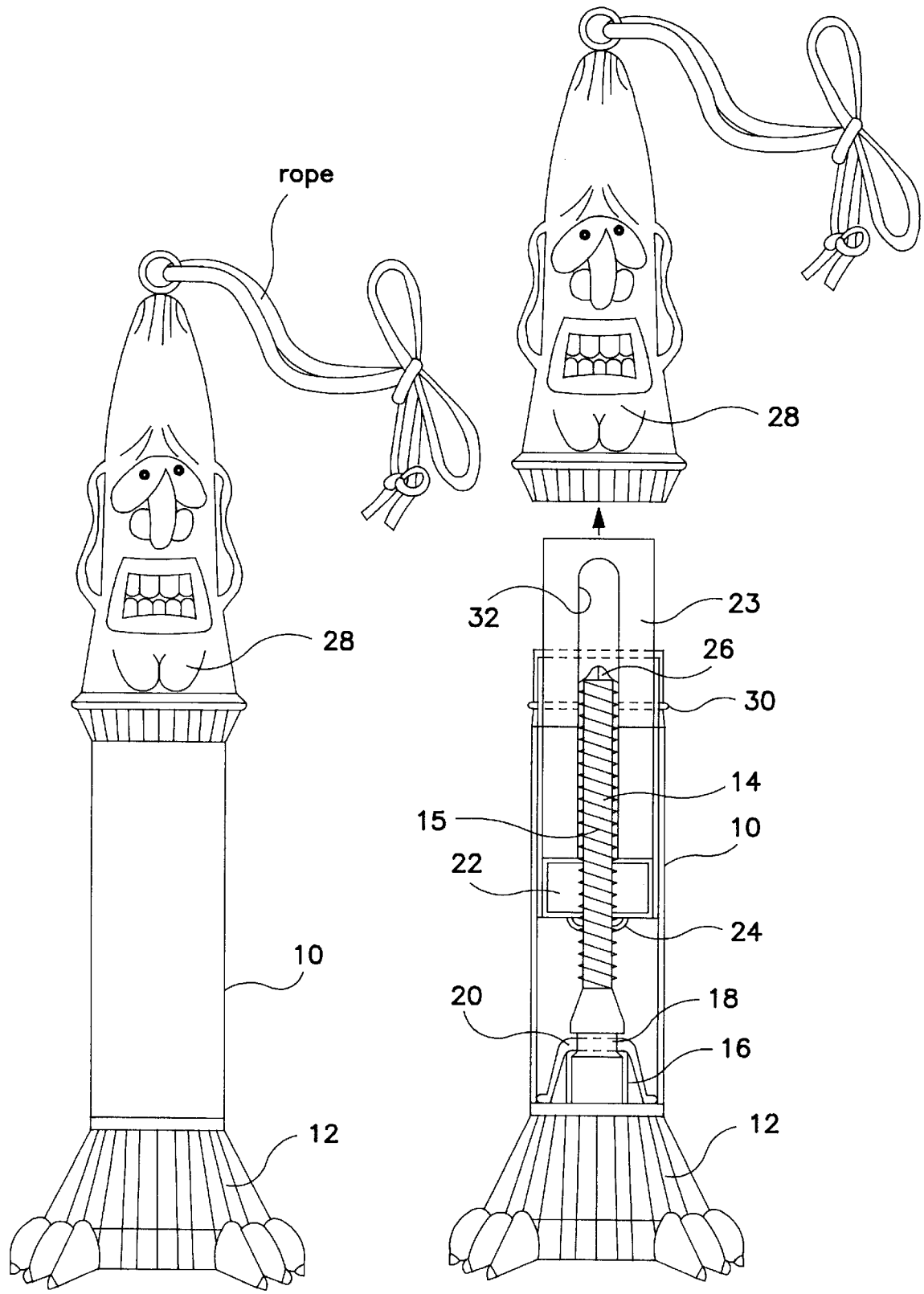
FIG. 1 illustrates a side view of the device with a novelty head and holding means.
FIG. 2 is a partial cross-sectional view illustrating the operative parts of the candy twister.

Now referring to the drawing, there is shown a candy twister which includes a cylindrical main housing 10 or any other desired shape which can be made of plastic or any other material. The device includes a rotatable base 12 to which a threaded shaft 14 including threads 15 is secured by a connector 16 which has a reduced diameter portion 18 which is rotatable in a shaft support anchor 20 which is fixedly secured at one end to the bottom of the housing.

The threaded shaft extends along the axis of the housing through a candy piece support seat 22 which includes a threaded nut 24 on a bottom surface through which the threaded shaft extends for moving the candy piece seat 22 and a piece of candy 23 in each direction, as desired. The upper end of the threaded shaft is provided with a small flange 26 which functions as a stop for the candy piece seat. The flange prevents the candy seat from being forced from the housing. The housing is provided with a decorative head or cap 28 which can be screw threaded onto the housing or forced over the upper end of the housing and held on the housing by an O-ring 30.

The piece of candy is formed about a hollow sleeve 32 and sits on the candy piece seat. The threaded shaft passes through the candy piece seat and extends into the sleeve about which the candy is formed. The threaded shaft is rotated by the base 12 to move the candy up or down as is necessary. The cap or head is provided with a string, rope or any other described attaching means by which the device can be secured to a persons' body such as about the neck or arm or secured to a piece of clothing such as a belt or any other means.

In operation, the candy piece is formed on a sleeve and with the cap removed, the candy piece is seated on the candy piece seat 22. In order to have the most candy for consumption the candy piece will have a length that extends from the candy piece seat in the lowest position up to an upper end of the housing. The threaded shaft is rotated in one direction in order to move the candy piece seat to its lowest position and then rotated in an opposite direction in order to feed the candy from the housing as necessary for consumption. Of course, when the candy is not being consumed it would be expected to be contained entirely within the housing with the cap in place. The candy twister could then be supported by the string as desired. The flanged end 26 of the shaft prevents the candy piece seat from escaping from the housing.

We claim:

1. A candy holding device which comprises a hollow housing (10),
    a base (12) for supporting said housing,
    a candy piece support seat (22) in said housing supporting a piece of candy,
    a screw threaded shaft which is rotatable by said base and which extends along a longitudinal axis of said housing and extends through said candy piece support seat and through a threaded nut on said candy piece support seat for moving said candy piece support seat along the axis of said housing, and
    a cap for enclosing said housing.

2. The candy holding device according to claim 1, in which, said threaded shaft includes an anchor which is secured to said base for anchoring said threaded shaft for rotation by said base.

3. The candy holding device according to claim 2, which includes
    a piece of candy,
    said piece of candy is formed on a hollow sleeve into which said threaded shaft extends with said piece of candy seated on said candy piece support seat.

4. The candy holding device according to claim 3, in which
    said housing cap is designed to represent a hat, or a head of a character, animal, or alien, and said cap is provided with a means for carrying or securing the candy holding device.

5. The candy holding device according to claim 4, in which said candy holding device is made of plastic.

6. The candy holding device according to claim 1, in which
    said screw threaded shaft includes a flanged end (26) which prevents said candy piece support seat from being removed from said housing.

7. The candy holding device according to claim 2, in which said screw threaded shaft includes a flanged end (26) which prevents said candy piece support seat from being removed from said housing.

8. The candy holding device according to claim 3, in which
    said screw threaded shaft includes a flanged end (26) which prevents said candy piece support seat from being removed from said housing.

9. The candy holding device according to claim 4, in which
    said screw threaded shaft includes a flanged end (26) which prevents said candy piece support seat from being removed from said housing.

10. The candy holding device according to claim 5, in which
    said screw threaded shaft includes a flanged end (26) which prevents said candy piece support seat from being removed from said housing.

* * * * *